Patented Jan. 8, 1946

2,392,607

UNITED STATES PATENT OFFICE 2,392,607

PREPARATION OF MONO-ARYL MELAMINES

Daniel E. Nagy, Stamford, Conn., assignor to American Cyanamid Company, New York, N. Y., a corporation of Maine No Drawing. Application September 14, 1944, Serial No. 554,153

5 Claims. (Cl. 260—249.5)

This invention relates to a new method of preparing mono-aryl substituted melamines.

I have discovered that primary aromatic amines may be caused to react with 1,3-dicyanoguanidine at a pH of less than about 1 to form mono-aryl-substituted melamines. The new reaction may be illustrated by means of the following equation:

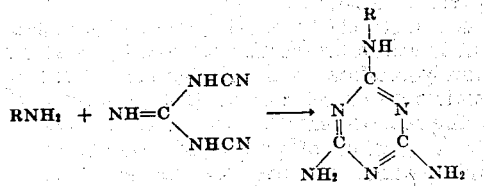

In the above equation R represents an aryl radical which may be substituted with various types and kinds of substituents.

The compound 1,3-dicyanoguanidine is new but its properties and preparation are described in the copending application of Donald W. Kaiser and Jack T. Thurston, Serial No. 524,072, filed February 26, 1944, now Patent No. 2,371,100, issued March 6, 1945. The compound is prepared by mixing together dicyandiamide, a water-soluble alkali metal, or alkaline earth metal hydroxide, and thereafter adding cyanogen chloride. Ordinarily the product is obtained in the form of an alkali metal or alkaline earth metal salt, but the free acid may be obtained by neutralizing the alkali metal or alkaline earth metal salt-forming group with a strong, inorganic acid. Various other metal, ammonium, and amine salts of the 1,3-dicyanoguanidine may be prepared by neutralization of the free acid or by methods of double decomposition, and they may be used in the process described and claimed herein. Since the 1,3-dicyanoguanidine is most easily obtained in the form of one of its alkali metal salts, I prefer to use the alkali metal salts of 1,3-dicyanoguanidine in my new reaction in the preparation of mono-aryl-substituted melamines.

Any of the common primary aryl amines may be used in my reaction. Among these may be mentioned aniline, nitroaniline, phenylenediamine, toluidine, xylidine, metachloraniline, p-aminodiphenyl, α and β-naphthylamines, etc. These amines may be used in the form of the free base or as one of their numerous acid salts.

As previously stated, the reaction takes place at a pH of less than about 1, preferably less than about 0.5. Under these pH conditions, the 1,3-dicyanoguanidine exists in the form of its free acid, even though one of its numerous salts is used as the starting material. Since free, 1,3-dicyanoguanidine tends to decompose in the presence of strong acids, I prefer that the reaction be carried out under such conditions that the 1,3-dicyanoguanidine is not allowed to remain in contact with the strong acid for a substantial period of time. This may be accomplished by preparing a solution of the desired primary aryl amine in a strong acid and then adding thereto the 1,3-dicyanoguanidine either as the free acid or as one of its salts. When carrying the reaction out in this manner, the 1,3-dicyanoguanidine reacts with the primary aryl amine before there is appreciable decomposition of the former.

My new reaction is usually carried out in the presence of a solvent, such as water or some other inert solvent, such as Cellosolve, dioxane, or mixtures thereof. The temperature of the reaction may vary from about 0° C. to 150° C. or higher. At the lower temperatures the use of more acid is desirable.

My invention will now be illustrated by means of the following specific examples. It will be understood, of course, that these examples are merely illustrative and are not intended to limit my invention to the particular reactants or conditions described therein. All parts are by weight unless otherwise indicated.

Example 1

To a mixture of 18.6 g. (0.2 mol) aniline, 51 cc. (0.6 mol) hydrochloric acid and 24 cc. of water heated to about 98° C. was added 32 g. (0.22 mol) of mono-potassium 1,3-dicyanoguanidine dissolved in 75 cc. of water, during a period of ten minutes. The reaction mixture was kept at about 98° C. for twenty minutes longer. To the original reaction mixture was added 100% excess of hydochloric acid and after cooling the phenyl melamine hydrochloride salt was filtered off. Without washing, the crude material was suspended in hot water and made faintly alkaline. The phenyl melamine therein separated as a gum which solidified on further stirring. The lumps were broken up, and, when the solution was cold, excess alkali was added to solubilize any ammeline that might have been present. The precipitate was filtered and washed with ice water. A yield of 62% of mono-phenyl melamine was obtained, having a melting point of 204° C.

Example 2

To a mixture of 21.6 g. (0.2 mol) p-phenylenediamine, 85 cc. (1.0 mol) hydrochloric acid and 115 cc. of water heated to 70° C. was added during thirty minutes 32 g. (0.22 mol) of powdered mono-potassium 1,3-dicyanoguanidine. The mixture was heated an additional thirty minutes at 70° C. The p-aminophenyl melamine formed therein was obtained as the hydrochloride salt by the addition of 100% excess hydrochloric acid. The crude yield was 61.5%. The crude product was recrystallized twice as the hydrochloride and then converted to the free base which was brown in color and melted at 232° to 235° C.

Example 3

To a mixture of 10.8 g. (0.1 mol) of p-phenylenediamine, 64 cc. (0.75 mol) of hydrochloric acid, and 190 cc. of water at 98° C. was slowly added over a period of twenty minutes 47.8 g. (0.33 mol) of potassium 1,3-dicyanoguanidine. The reaction mixture was then heated for an additional ten minutes at 98° C. p-Phenylenedimelamine was obtained in good yields.

Example 4

To a mixture of 18.6 g. of aniline, 68 cc. of hydrochloric acid, and 50 cc. of water at 5° C. was slowly added over a period of thirty minutes 30 g. of potassium 1,3-dicyanoguanidine. Reaction of the dicyanoguanidine with the aniline occurred during the addition of the salt. After allowing the reaction mixture to stand for eighteen hours at room temperature phenyl melamine was recovered with a yield of 60.5% by crystallization from the reaction mixture of the hydrochloride salt as in Example 1.

Example 5

To a mixture of 18.6 g. of aniline, 23 cc. of hydrochloric acid, and 25 cc. of water at a temperature of 90° C. was slowly added over a period of twenty-five minutes a mixture of 30 g. of potassium 1,3-dicyanoguanidine, 50 cc. of dioxane and 13.6 cc. of hydrochloric acid. After allowing the reaction mixture to stand at 90° C. for thirty more minutes phenyl melamine was obtained upon crystallization, as in Example 1, with a yield of approximately 75% of theoretical.

Example 6

A solution of 60 g. of 95% sulfuric acid (0.6 mol) in 120 cc. of water was prepared, and 18.6 g. (0.2 mol) of aniline was dissolved therein. The clear solution was heated to 45–50° C., and 30 g. (0.2 mol) of potassium 1,3-dicyanoguanidine was added over a period of one-half hour. The solution was heated at 45–50° C. for fifteen minutes longer and then cooled and made alkaline. A slightly gummy solid which separated was filtered off. The impure, gummy phenyl melamine was purified by recrystallization from water as the hydrochloride salt. A sample of the product converted to the free base melted at 202° C.

I claim:

1. A process of preparing mono-aryl melamines which comprises bringing together and causing to react 1,3-dicyanoguanidine and a primary aryl amine at a pH of less than about 1.

2. A method of preparing mono-aryl melamines which comprises bringing together and causing to react 1,3-dicyanoguanidine and a primary aryl amine in the presence of an aqueous solution of hydrochloric acid at a pH of less than about 1.

3. A method of preparing mono-aryl melamines which comprises adding a salt of 1,3-dicyanoguanidine to a solution of a primary aryl amine while maintaining the pH of the reaction mixture at less than about 1.

4. A method of preparing mono-aryl melamines which comprises adding an alkali metal 1,3-dicyanoguanidine to a primary aryl amine in an acidic aqueous solution while maintaining the pH of the reaction mixture at less than about 1.

5. A method of preparing mono-phenyl melamine which comprises adding an alkali metal salt of 1,3-dicyanoguanidine to an aqueous solution of aniline in hydrochloric acid while maintaining the pH of the reaction mixture at less than about 1.

DANIEL E. NAGY.